Hazeltine & Wheeler,
Horseshoe Cushion.

No. 95,107. Patented Sep. 21, 1869.

Witnesses.
John E. Crane
Wm S. Brown

Inventors.
John Hazeltine
Chas. L. Wheeler

United States Patent Office.

JOHN HASELTINE, OF MELROSE, AND CHARLES L. WHEELER, OF CAMBRIDGE, MASSACHUSETTS; SAID HASELTINE ASSIGNS HIS HALF TO SAID WHEELER.

Letters Patent No. 95,107, dated September 21, 1869.

IMPROVEMENT IN ELASTIC CUSHIONS FOR HORSES' FEET.

The Schedule referred to in these Letters Patent and making part of the same.

*To all whom it may concern:*

Be it known that we, JOHN HASELTINE, of Melrose, and CHARLES L. WHEELER, of Cambridge, both in the county of Middlesex, and State of Massachusetts, have invented certain new and useful Improvements in Elastic Cushions for Horseshoes, or for Horses' Feet; of which the following is a full, clear, and exact description, reference being had to the accompanying drawings, making part of this specification, in which—

Figure 1:
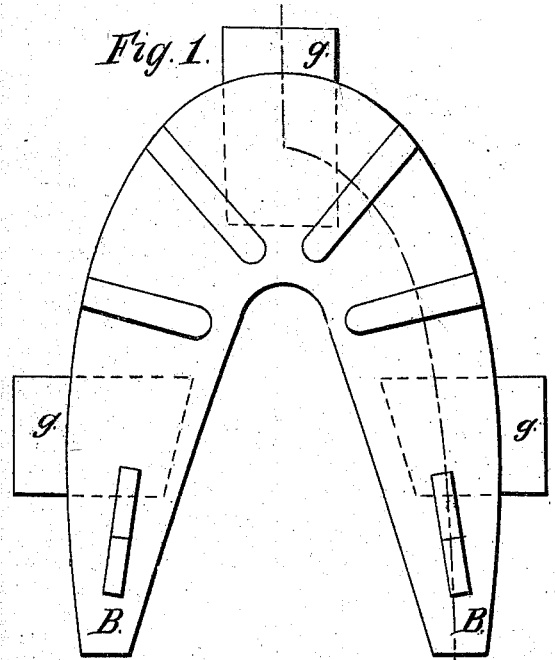
Figure 2:
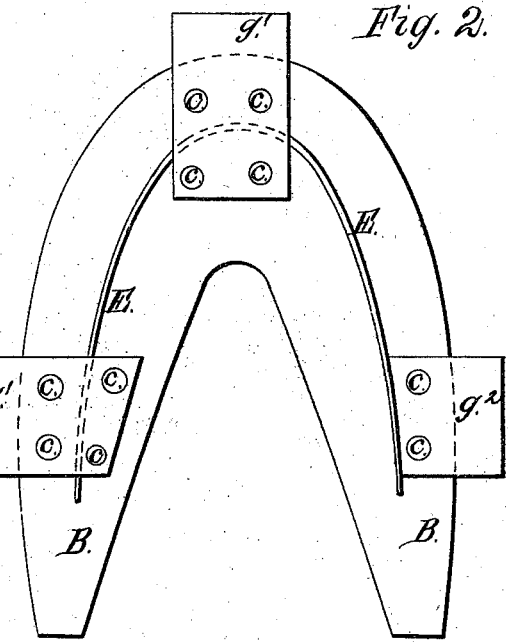
Figure 3:
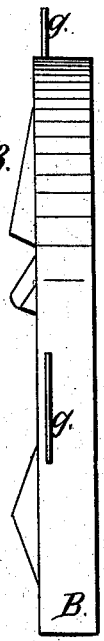

Figure 1 represents a plan or top view;

Figure 2, a horizontal section;

Figure 3, an edge view; and

Figure 4:
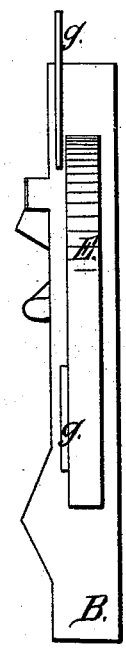

Figure 4, a vertical sectional elevation, on the curved red line A B of fig. 1.

This invention and improvement consists, first, in the combination, with an elastic or flexible rubber cushion, constructed, as shown and described, of a metal spring, E, when the said spring is applied to the cushion, by embedding the former in the substance of the latter while in a plastic state, and when formed in the mould, and by vulcanizing the rubber thus formed or moulded around the spring, the said vulcanized rubber cushion being made in the form clearly shown in the drawings, so as to fill the cavity between the shoe and the frog, and not to cover the latter, but preferably to leave it exposed to the atmosphere, so as to keep it in a healthy condition, and to prevent the accumulation and retention of snow, mud, or other substances, which injuriously affect the foot and the frog. This spring, thus embedded in the rubber which is vulcanized all around it, is not only protected from the action of corrosive agents, but it is perfectly cushioned by the yielding rubber, and a spring thus protected and cushioned cannot be easily broken, or injured, or materially weakened by continued use, for the elastic and yielding substance within and beyond the bow of the spring adheres to and otherwise almost prevents the possibility of a change in the curve of the latter; and if the curve is not changed, the spring cannot be easily broken while the rubber endures.

If, by chance, the spring should break at or about the centre of the bow or forward part, the cushion may still be successfully used, for the adhesive and cushioning action of the rubber so assists the spring as to render it operative, even though broken at the bow or considerably weakened.

A spring thus enclosed in the cushion cannot hurt or injure the foot of the horse, nor become detached by the rotting of stitching-thread, as in the patent to A. H. Knapp, where the hard metal spring, merely covered with leather, bears against the under side of the foot and the softer substance of the heel, and will hurt the heels, and make them tender and sore, and stitching-thread will soon rot and liberate the spring; whereas in our invention the spring is in the middle of the cushion, and shorter than the latter, and only the soft rubber comes in contact with the foot or heel, and this soft substance cannot hurt or injure the foot.

Second, our invention consists in the combination, with an elastic cushion, constructed and provided with a spring, as described, of catches $g$, which are applied to the vulcanized rubber cushion when the same is formed in the mould, thus forming rubber rivets $c$ through holes made in the catches. The rubber being vulcanized during the process fastens the catches to the cushions in a very permanent manner.

The spring E is also applied or embedded in the substance of the cushion when it is formed in the mould, and the process of vulcanizing the rubber completes the operation of combining the spring with the cushion, the spring having been previously bent or shaped to conform with the shape or form of the cushion, as shown in fig. 2.

This improved elastic cushion is intended to be applied to the feet of the horse when travelling in or upon snow, and the object of it is to prevent the feet of the animal getting balled up, or, in other words, to prevent the snow lodging or collecting in the under cavity of the foot, within the shoe, and around the frog.

This invention is intended as an improvement on the patent of the above-named JOHN HASELTINE, dated May 19, 1868, wherein the elastic cushion is secured in the place by wires or strips looped to the cushion, and passing between the hoof and the shoe, and bent up or clinched on the outside of the former.

These looped wires are ample to hold the cushion in its place, but the application and removal of the elastic cushion by means of these wires are of necessity at times difficult and troublesome, or at least inconvenient, as the slots or openings made for the passage of the wires are liable to get filled with dirt, and the frequent bending of the wires so injures them that they have to be frequently or occasionally renewed, and the common elastic cushion will not stay in its place unless held by the wires before named.

This invention obviates the above-named difficulties, and provides a ready remedy. This elastic cushion is applied to the foot of the horse, where a slight or limited space is left between the inner portion of shoe and the hoof, by first inserting the forward catch and one of the side catches in the above-named space. Then, by springing the opposite side or prong of the cushion inward toward the other side near enough to allow the opposite catch to pass the inner edge of the shoe and into the space beyond it. Then, by letting go the last-named side or prong of the cushion, the sides of the latter are forced outward and into contact with the inner edge of the shoe and the catches beneath it, by the action of the spring E, which, being perfectly covered or embedded in the rubber, will always remain in the same position, and fully protected from wear, injury, or exposure, either of which would soon spoil the spring; besides, the spring thus embedded in the rubber, and there vulcanized, cannot seemingly injure the foot of the animal or cause pain when travelling.

This elastic cushion is readily removed from the foot by springing one of the sides or prongs B in toward the other, and near enough to allow the catch to be withdrawn from the space. Then, by pulling the said prong downward or clear of the shoe, the opposite catch and the forward catch may be easily liberated and the cushion taken from the foot. The side catches or the forward one may be butted against the spring, as seen at $g^2$, in fig. 2, but we consider it better to make such catches longer, and lap them over the spring, as seen at $g^1$, in the same figure.

The rubber rivets c, formed through the holes in the catches in the process of moulding and vulcanizing the cushion, make a permanent connection of the former with the latter without cost or expense, and the elastic cushion made as herein described answers admirably the purpose for which it is intended.

We claim as follows:

1. The combination, with an elastic or flexible rubber cushion, constructed substantially in the form as shown and described, of a metal spring, E, when the said spring is applied to the cushion in the manner, by the means, and for the purpose specified.

2. The combination, with an elastic or flexible rubber cushion, formed, constructed, and provided with a spring, as described, of catches g, when said catches are applied to the cushion in the manner, by the means, and for the purpose specified.

JOHN HASELTINE.
CHAS. L. WHEELER.

Witnesses:
JOHN E. CRANE,
WM. S. BROWN.